United States Patent
Reist et al.

[11] Patent Number: 6,048,160
[45] Date of Patent: Apr. 11, 2000

[54] BALE LOADING DEVICE

[76] Inventors: Edward Reist, R.R. #4, Listowel, Ontario, Canada, N4W 3G9; Robert Musselman, R.R. #1, Tavistock, Ontario, Canada, N0B 2R0

[21] Appl. No.: 09/343,540

[22] Filed: Jun. 30, 1999

[51] Int. Cl.$^7$ ...................................................... B60P 1/48
[52] U.S. Cl. ........................... 414/555; 414/111; 414/552
[58] Field of Search .................................. 414/24.5, 24.6, 414/111, 551, 552, 555

[56] References Cited

U.S. PATENT DOCUMENTS

| | | | |
|---|---|---|---|
| 2,693,285 | 11/1954 | Buschbom | 414/555 |
| 2,758,729 | 8/1956 | Van Dusen | 414/555 |
| 4,008,818 | 2/1977 | Neely, Jr. | |
| 4,076,138 | 2/1978 | Honomichl, Sr. | 414/555 X |
| 4,909,694 | 3/1990 | Peters et al. | 414/24.5 |
| 5,333,981 | 8/1994 | Pronovost et al. | 414/24.5 |
| 5,690,461 | 11/1997 | Tilley | 414/551 X |
| 5,846,046 | 12/1998 | Warburton | 414/555 X |

OTHER PUBLICATIONS

New Holland Automatic Bale Wagon Brochure, Copyright date 1996.
Undated Brochure of Stinger Ltd.
Undated Brochure of PROAG Designs Inc.—Large Square Bale Stacker.

*Primary Examiner*—Janice L. Krizek
*Attorney, Agent, or Firm*—Merek & Voorhees

[57] ABSTRACT

An apparatus for loading and transporting bales of hay or straw. The apparatus includes a chassis, at least one bale receiving table, a bale loader pivotally mounted to the chassis and having an inwardly disposed longitudinal arm and an outwardly disposed longitudinal arm spaced apart by a cross member with at least one of the arms pivotally connected to the cross member. The inwardly or outwardly disposed longitudinal arms are pivotal about the cross member to increase or decrease the distance between the arms so as to grasp or release a bale of hay or straw therebetween. The bale loader is piovotal about the chassis to enable the lifting of a bale of hay or straw onto the bale receiving table. The chassis has a plurality of wheels to permit it to be moved along the surface of the ground.

13 Claims, 9 Drawing Sheets

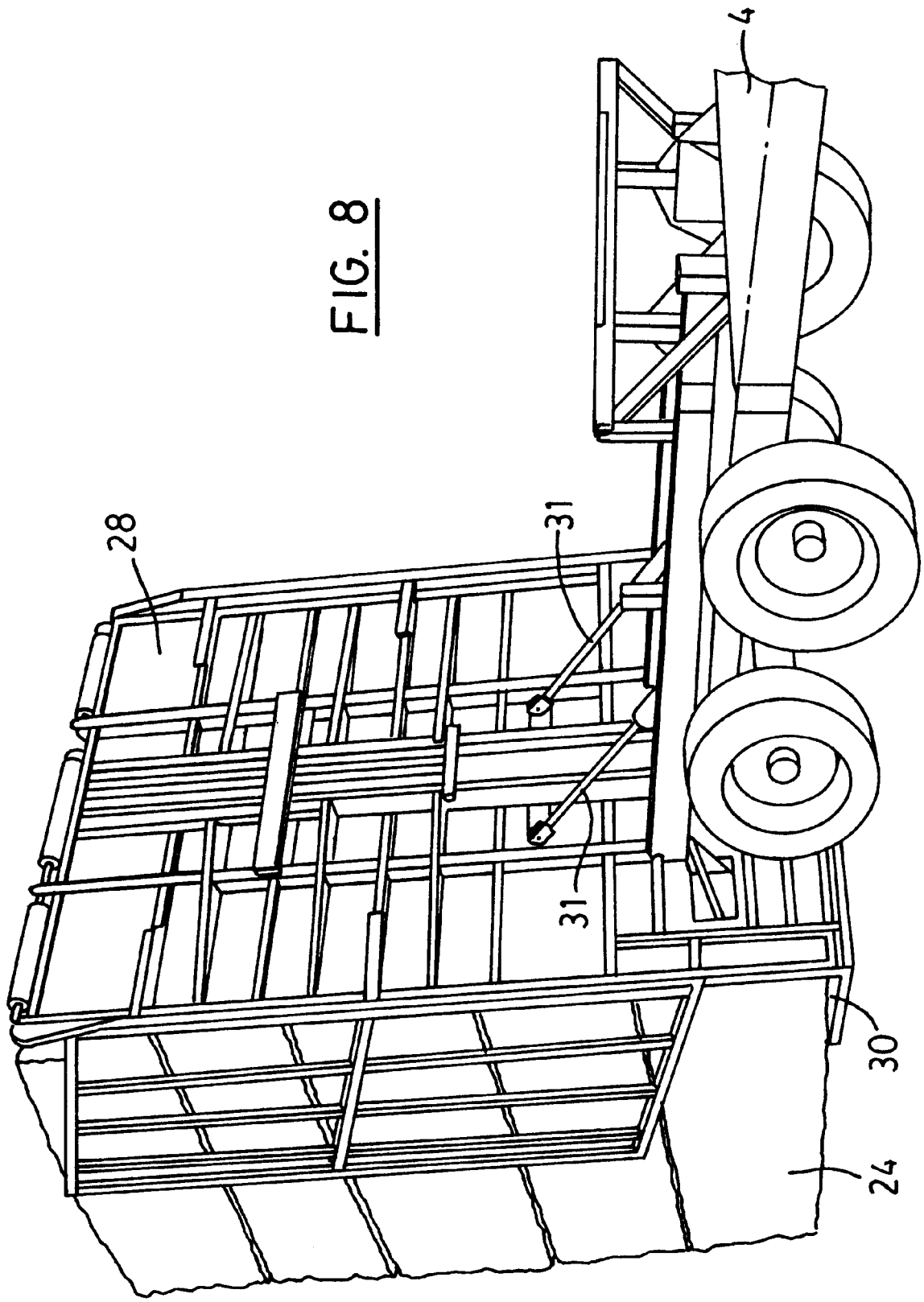

BALE LOADING DEVICE

FIELD OF THE INVENTION

This invention relates to a bale loading device that assists in the loading of bales of hay or straw onto a wagon, trailer or platform.

BACKGROUND OF THE INVENTION

When hay or straw is cut in a field it is typically formed and tied into rectangular shaped bales through the use of automatic baling equipment. Such equipment normally deposits the tied bales in rows across the field, leaving the bales to be later picked up and transported to a barn or other storage facility. Traditionally the bales were manually lifted and stacked upon a wagon drawn by a horse, tractor or other piece of machinery. However, such work was slow, difficult and labour intensive. To reduce the amount of manual labour required to load and transport bales of hay or straw others have developed automatic loading devices that mechanically lift the bales from the ground and place or stack them upon a wagon or trailer. Such devices have also been developed as a result of an increase in large scale farming, where bales weighing upwards of several hundred pounds are often utilized. Unfortunately, such devices generally include the use of various types of conveyor belts and/or fixed arm loaders that are mechanically inefficient, and that include a large number of moving parts that are susceptible to wear and breakage. Such devices are also not readily adaptable to utilization on bales of different sizes or weights.

SUMMARY OF THE INVENTION

The invention therefore provides an apparatus for loading and transporting bales of hay or straw which is simple and efficient in operation, that is devoid of conveyor systems, and that comprises relatively few moving parts. In one embodiment the apparatus is also capable of loading bales of different sizes and weights.

Accordingly, in one of its aspects the invention provides an apparatus for loading and transporting bales of hay or straw, the apparatus comprising a chassis having mounted thereon a plurality of wheels to permit said chassis to be moved along the surface of the ground; at least one bale receiving table mounted on said chassis to receive one or more bales of hay or straw loaded thereon; a bale loader pivotally mounted on said chassis, said bale loader including an inwardly disposed longitudinal arm and an outwardly disposed longitudinal arm, said inwardly and outwardly disposed longitudinal arms laterally spaced apart by a cross member, said inwardly and outwardly disposed longitudinal arms and said cross member being generally co-planer with at least one of said arms pivotally connected to said cross member; means to pivot said at least one inwardly or outwardly disposed longitudinal arm about said cross member to increase or decrease the distance between said arms so as to grasp or release a bale of hay or straw therebetween; and, means to pivot said bale loader about said chassis to enable the lifting of a bale of hay or straw onto said bale receiving table.

In a further aspect the invention provides a bale loading device for loading bales of hay or straw onto a wagon or platform, the device comprising an inwardly disposed longitudinal arm and an outwardly disposed longitudinal arm connected to and laterally spanned by a cross member, said inwardly and outwardly disposed longitudinal arms and said cross member defining a bale receiving opening therebetween for receiving a bale of hay or straw; pivot means to allow said inwardly and outwardly disposed longitudinal arms and said cross member to pivot upwardly so as to deposit a bale of hay or straw onto the wagon or platform when the bale is received within said bale receiving opening; and, at least one kicker arm, said kicker arm assisting in the expulsion of a bale of hay or straw from said bale receiving opening onto the wagon or platform through the application of force to the bale.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
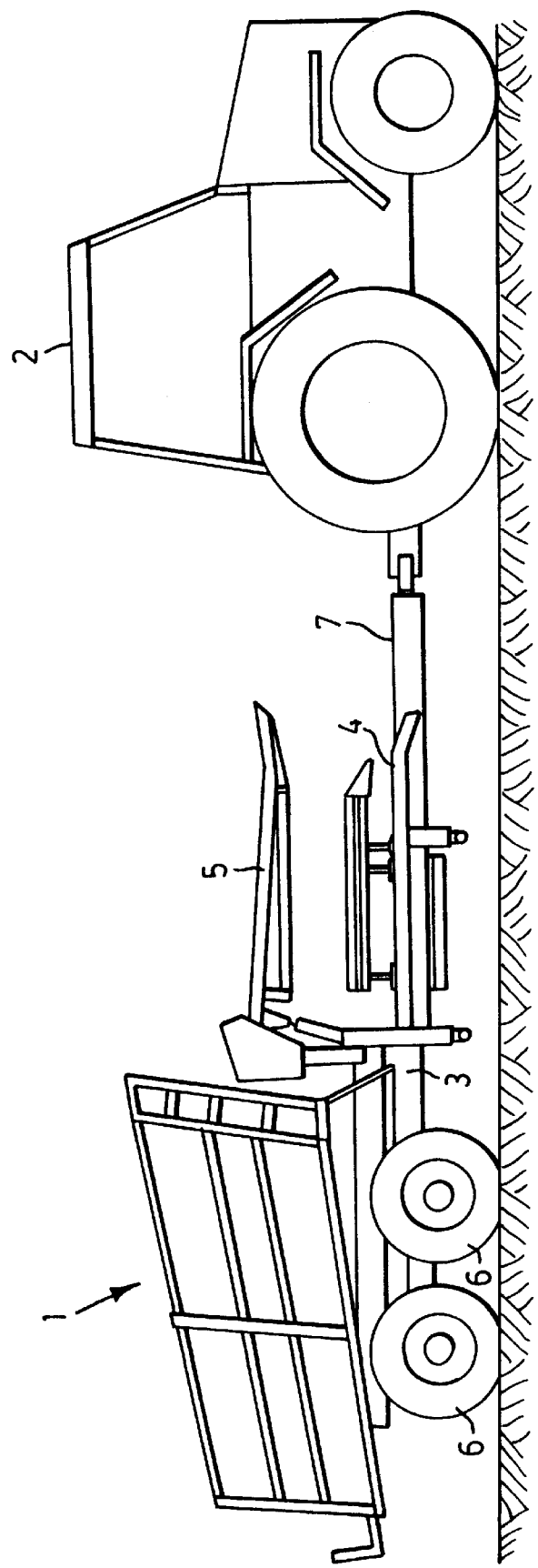
FIG. 1 is a side view of the apparatus for loading and transporting bales of hay or straw pursuant to the present invention would be typically drawn behind a tractor or vehicle.

Referring to FIG. 1, there is depicted therein an apparatus 1 for loading and transporting bales of hay or straw according to one embodiment of the invention. In FIG. 1 apparatus 1 is shown as being pulled or towed by a tractor 2. Typically apparatus 1 would be pulled through a field by a tractor or other farm vehicle, however, it will be appreciated by those skilled in the art that in some instances it may be desirable to construct the device with its own internal mode of propulsion. In such cases the apparatus would typically include a gasoline or diesel engine and a drive train. In addition, with an appreciation of the invention it will be understood that while the primary applications of apparatus 1 are considered to be for loading and transporting bales of hay or straw, the device may equally be used for purposes of loading and transporting other crops that are bundled in bales, or other products having similar configurations.

Figure 2:
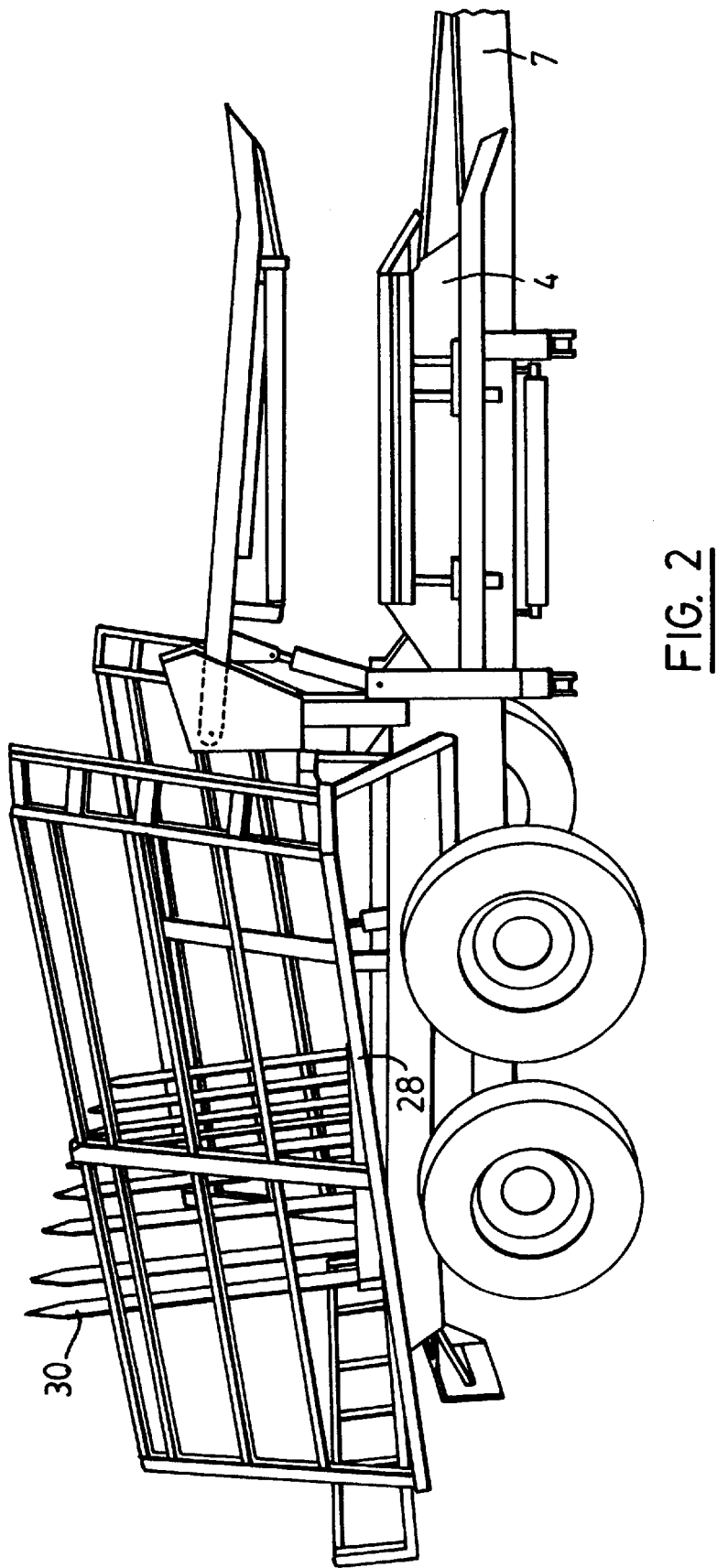
FIG. 2 is a detailed side elevational view of the apparatus for loading and transporting bales of hay or straw shown in FIG. 1.

As is shown more specifically in FIG. 2, apparatus 1 generally comprises a chassis 3, a bale receiving table 4 and a bale loader 5. Chassis 3 would typically have mounted thereon one or more axles containing wheels to allow the chassis to be pulled through a field or along a road. Where apparatus 1 contains its own internal mode of propulsion, wheels 6 would typically be connected to a drive train.

In the embodiment of apparatus 1 shown in the attached drawings, bale receiving table 4 is mounted generally on the front portion or front end 7 of chassis 3. Bale receiving table 4 is generally rectangular in shape and dimensioned so as to be capable of receiving and holding a desired number of bales of hay or straw. In FIGS. 1 through 8, bale receiving table 4 is of a size that receives four bales, however, table 4 could equally be made smaller or larger depending upon its particular application and the requirements of end users.

Bale loader 5 is pivotally mounted on chassis 3 is and is preferably adjacent to bale receiving table 4. Bale loader 5 includes an inwardly disposed longitudinal arm 8 and an outwardly disposed longitudinal arm 9 that are laterally spaced apart by a cross member 10. Inwardly disposed longitudinal arm 8 and outwardly disposed longitudinal arm 9 are generally co-planer and oriented generally parallel to the longitudinal axis of chassis 3, and to the direction of travel of apparatus 1. In one preferred embodiment of the invention, at least one of arms 8 and 9 is pivotally connected to cross member 10. In the attached Figures, outwardly disposed longitudinal arm 9 is shown as pivotally connected to cross member 10 whereas inwardly disposed longitudinal arm 8 is rigidly fixed to the cross member. The opening defined by inwardly disposed longitudinal arm 8, outwardly disposed longitudinal arm 9 and cross member 10 represents a bale receiving opening 11 for receiving and retaining a bale of hay or straw. By varying the spacing between arms 8 and 9, bales of different sizes can be received and retained within opening 11.

It will thus be appreciated that through pivotal movement of outwardly disposed longitudinal arm 9, the dimensions of bale receiving opening 11 can be varied. For example, arm 9 may be pivoted outwardly and away from arm 8 to enlarge bale receiving opening 11 and to facilitate the accommodation and receipt of a bale of hay or straw therein. Once a bale is received within opening 11 outer arm 9 can be pivoted inwardly toward arm 8 to firmly grasp and hold the bale in place. It will also be understood that through pivotal movement of outwardly disposed longitudinal arm 9 about cross member 10, the distance between the outer free ends of arms 8 and 9, 12 and 13 respectively, may be increased or decreased whereas the difference between the fixed ends of arms 8 and 9, 14 and 15 respectively, remains relatively unchanged. This enables bale receiving opening to be "opened up" at its forward end in order to help receive and direct a bale of hay or straw into the central portion of opening 11. The ability to "open up" bale receiving opening 11 also helps to direct bales into loader 5 in instances where the bales are not in alignment, or are not positioned parallel to the direction of travel of apparatus 1. Free ends 12 and 13 may include outwardly directed chamfers or bent guides 16 and 17 that further assist in directing a bale into bale receiving opening 11.

To assist in grasping a bale of hay or straw, in the preferred embodiment outwardly disposed longitudinal arm 9 includes a longitudinal roller 21 mounted along its interior surface and generally inclined from fixed end 15 to free end 13. Roller 21 and its attachment to the interior surface of outwardly disposed longitudinal arm 9 is shown most clearly in FIGS. 3 and 4. The positioning and inclination of roller 21 is such that upon pivotal movement of outwardly disposed longitudinal arm 9 toward inwardly disposed longitudinal arm 8 a bale of hay or straw positioned within bale receiving opening 11 is lifted slightly from the ground, with roller 21 driven beneath the bale. In this manner the bale is lifted and supported by outwardly disposed longitudinal arm 9. To help stabilize the bale arm 9 may include a lateral support member 22 (see FIG. 3).

Figure 3:
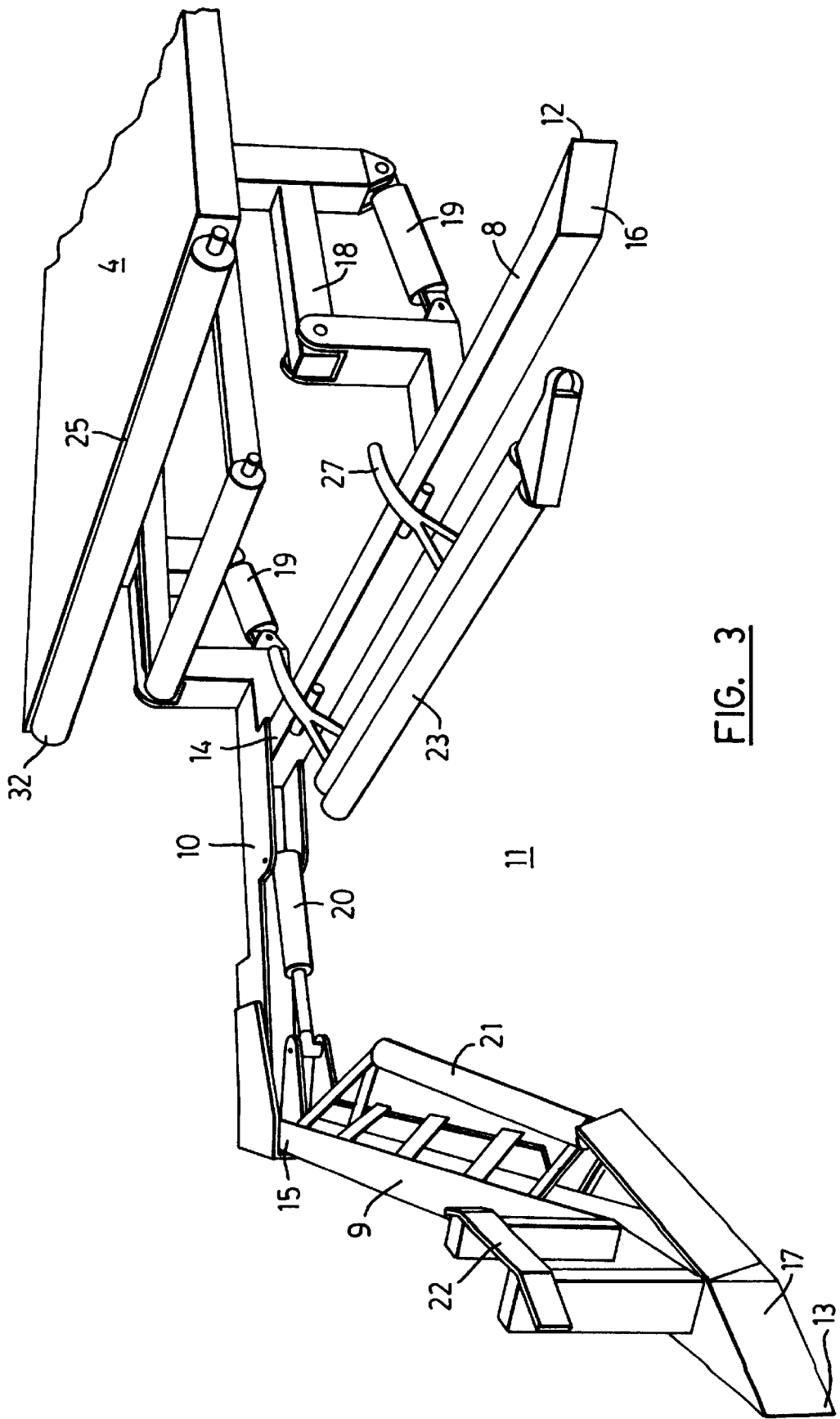
FIG. 3 is a front upper perspective view of the bale loader of the present invention.
Figure 4:
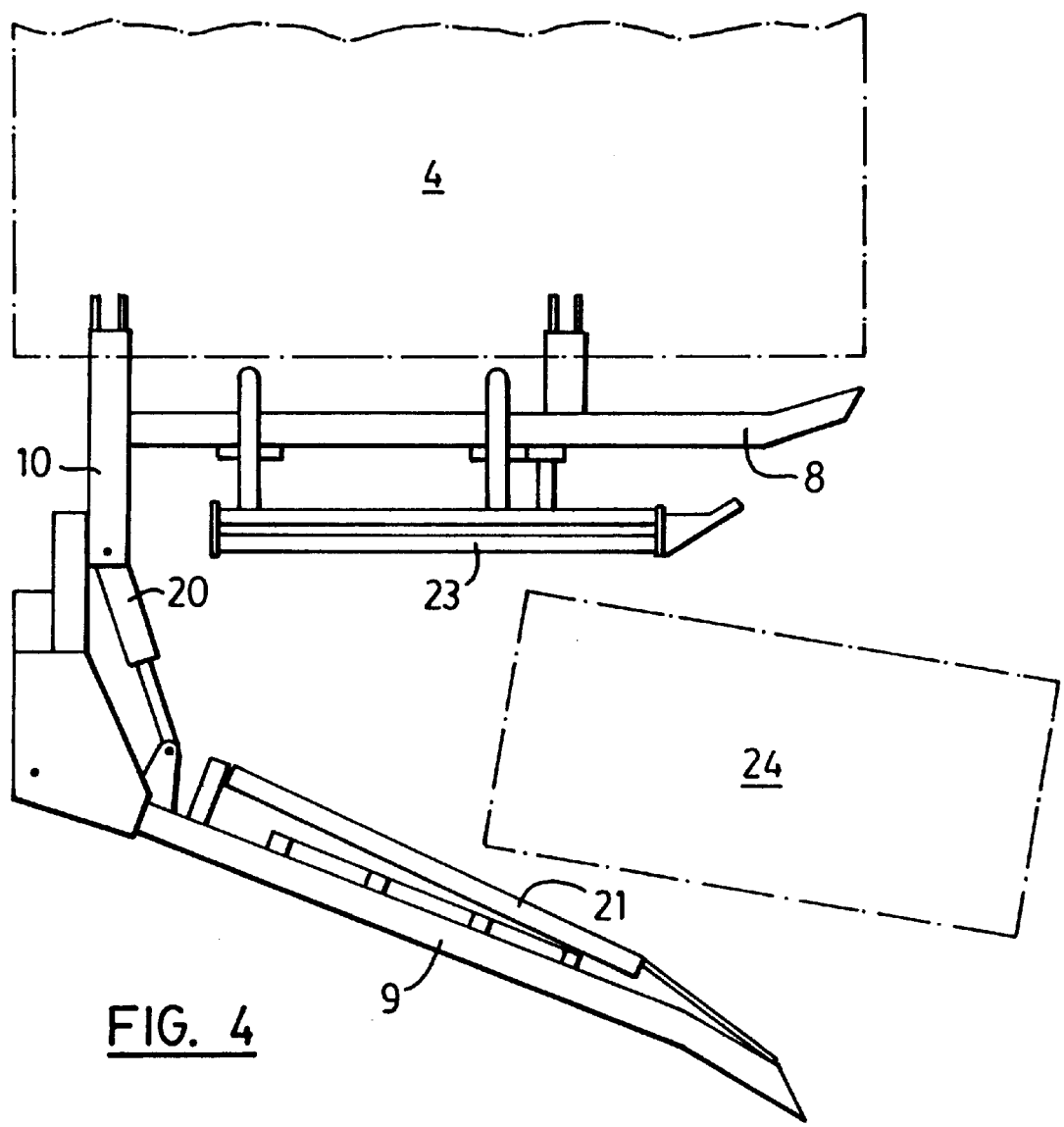
FIG. 4 is a top plan view of the bale loader shown in FIG. 3 in its open position and showing how it would be received around a bale of hay or straw.
Figure 5:
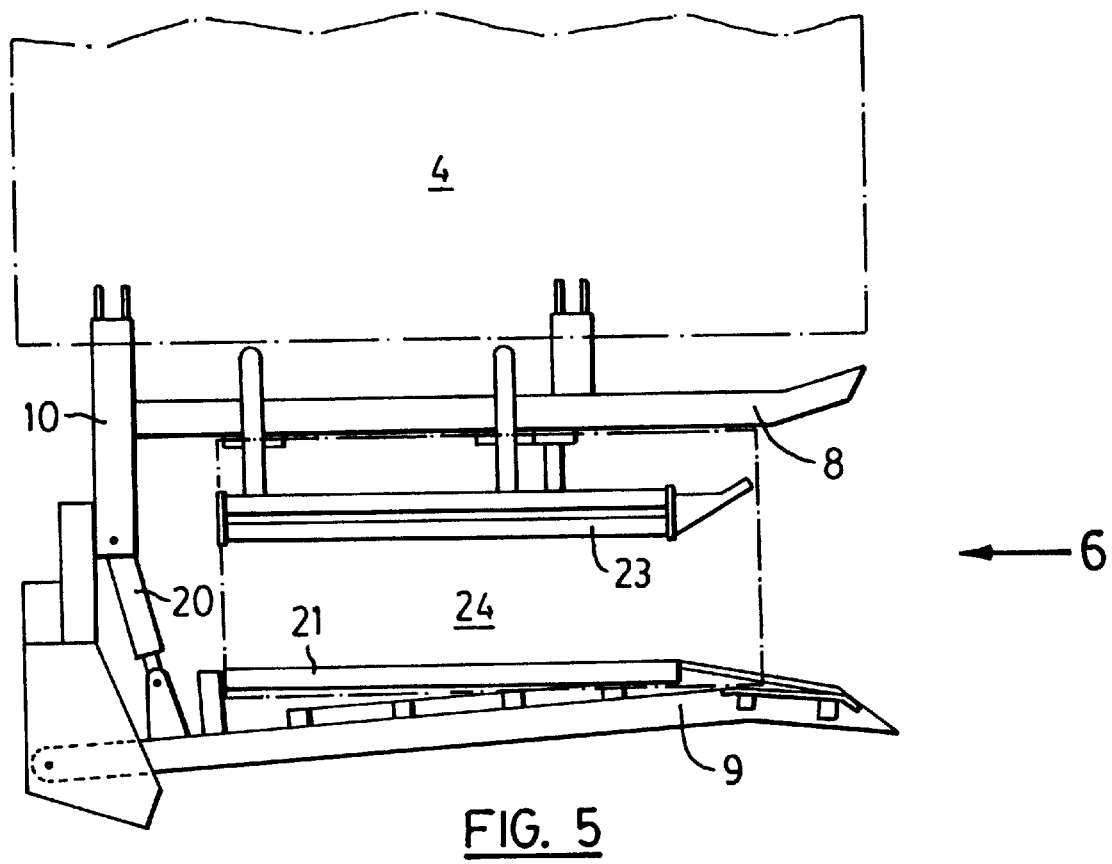
FIG. 5 is a top plan view of the bale loader shown in FIG. 4 in its closed position.

As also show in FIG. 3, inwardly disposed longitudinal arm 8 preferably includes a kicker rail 23 pivotally mounted along its outer edge. When a bale of hay or straw is positioned within bale receiving opening 11 and arm 9 rotated toward arm 8 such that longitudinal roller 21 is driven beneath the bale, the opposite side of the bale is simultaneously driven against kicker rail 23 causing the bale to ride up upon the kicker rail such that bale is generally supported by both kicker rail 23 and longitudinal roller 21. Whereas the attached drawings show a continuous kicker rail 23 pivotally mounted to inwardly disposed longitudinal arm 8, it should be appreciated that in an alternate embodiment of the invention kicker rail 23 may be comprised of one or more kicker arms positioned along the length of arm 8.

Apparatus 1 also includes means to pivot bale loader 5 about chassis 3 to enable the lifting of a bale of hay or straw onto bale receiving table 4. In the preferred embodiment the means to pivot bale loader 5 comprises a pair of pivot arms 18 attached to chassis 3 about which bale loader 5 may be rotated from an approximately horizontal to an approximately vertical position. Preferably the force required to pivot or rotate bale loader 5 about arms 18 is supplied through a hydraulic or pneumatic cylinder 19 connected to a pressurized fluid supply and control system for either manual or automatic actuation. Similarly, in the preferred embodiment a pneumatic or hydraulic cylinder 20, connected to the same control system, is utilized for purposes of pivoting outwardly disposed longitudinal arm 9 about cross member 10.

Figure 6A:
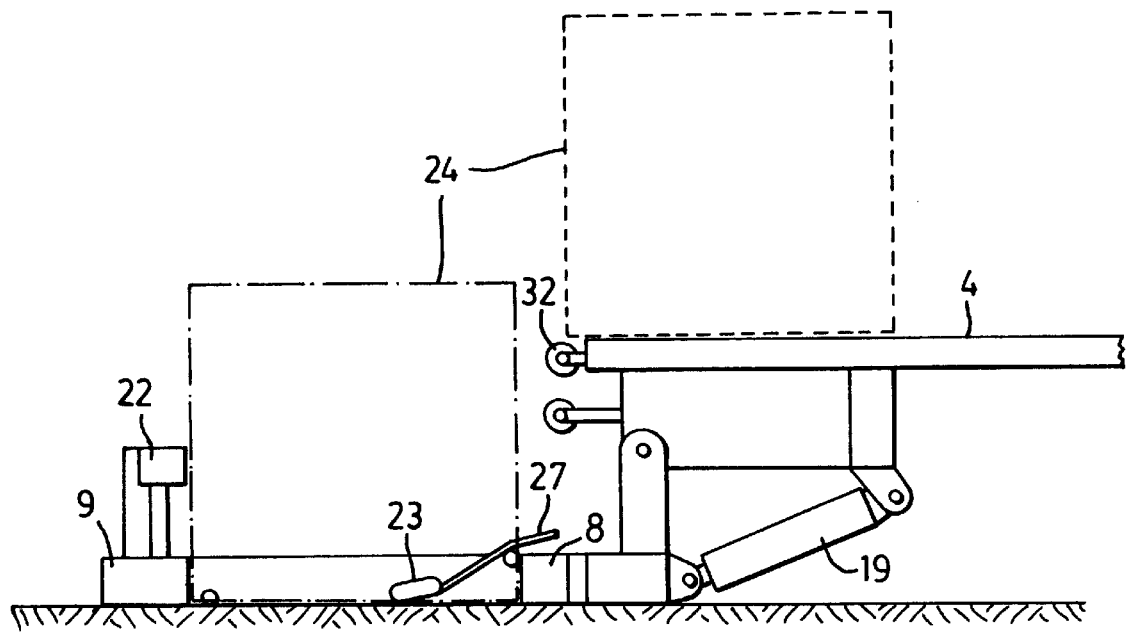
FIG. 6a is a front elevational view of the bale loader shown in FIG. 5 as viewed from direction "6" in FIG. 5.
Figure 6B:
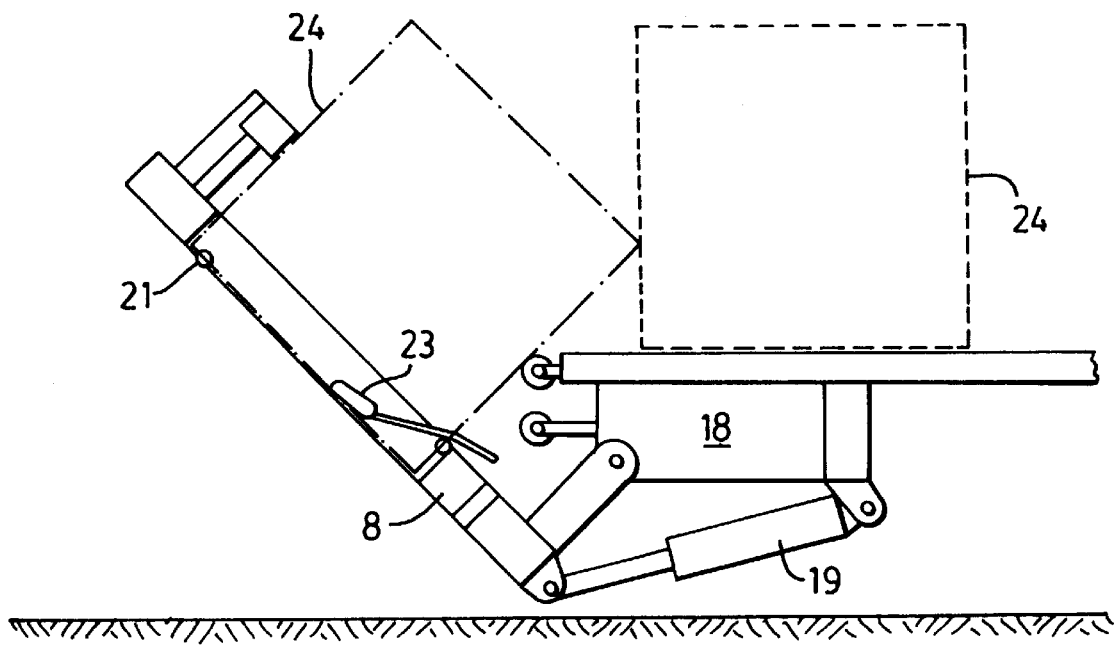
FIG. 6b is a front elevational view of the bale loader of FIG. 6a that has been pivoted upwardly by approximately 45 degrees.

The general manner of lifting and depositing a bale of hay or straw received within opening 11 will now be described with specific reference to FIGS. 6a through 6d. FIG. 6a through 6d show bale loader 5 pivotally mounted to chassis 3 with bales of hay or straw 24 shown in dotted outline. Referring to FIG. 6b, with bale 24 securely held between inwardly disposed longitudinal arm 8 and outwardly disposed longitudinal arm 9, cylinder 19 is activated to rotate bale loader 5 about pivot arms 18 on chassis 3. As bale loader 5 is rotated bale 24 is lifted until its interior side surface comes into contact with the side or lateral edge 25 of bale receiving table 4. Further upward rotation of bale loader 5 causes bale 24 to be pushed and deposited upon bale receiving table 4 (see FIG. 6c). When bale receiving table 4 is empty, bale 24 is merely lifted and deposited upon the surface of the table. However, where one or more bales have previously been deposited upon the table, the subsequent bale that is lifted by bale loader 5 contacts the previously loaded bale and drives the one or more bales positioned on the surface of table 4 laterally across the table. To facilitate the loading of bale 24 upon bale receiving table 4, and to prevent damage to the bale through contact with side 25 of table 4, in the preferred embodiment one or more rollers 32 are positioned along side 25.

Figure 6C:
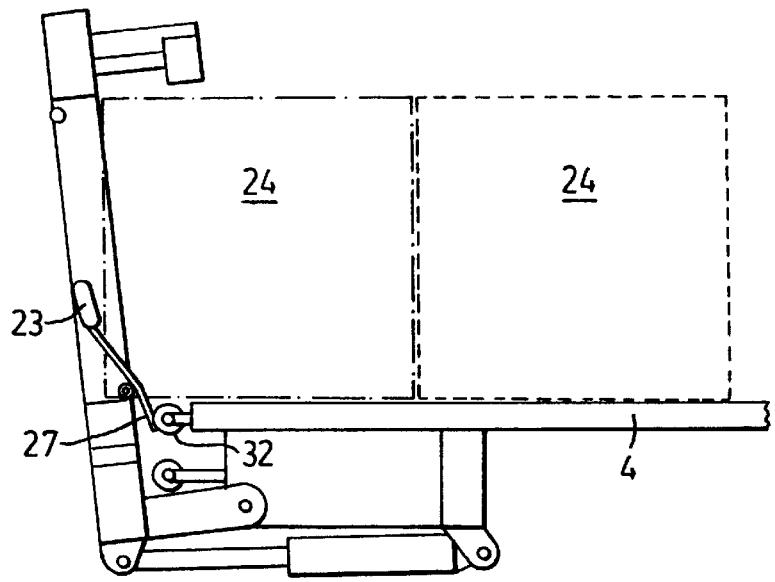
FIG. 6c is a front elevational view of the bale loader shown in FIG. 6a having been pivoted upwardly to an approximately vertical position to thereby deposit a bale of hay or straw onto a wagon or trailer.
Figure 6D:
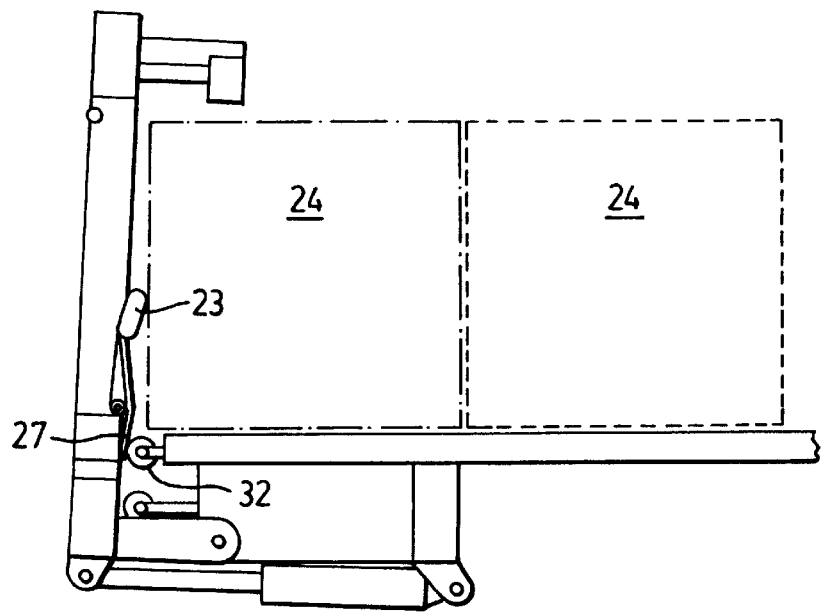
FIG. 6d is a front elevational view of the bale loader shown in FIG. 6a that has been pivoted upwardly such that its kicker arms have been engaged to drive the bale onto the wagon or trailer.

As bale loader 5 is rotated and approaches a vertical orientation, bale 24 will come to rest with one of its sides laying flat upon the upper surface of the table (see FIG. 6c). At this point the outer side of bale 24 will in most instances still slightly overhang the side of table 4 (see FIG. 6c). To assist in driving the bale completely onto the table, in the preferred embodiment kicker rail 23 includes activation means 26 that causes the kicker rail to rotate relative to inwardly disposed longitudinal arm 8 upon further upward rotation or pivotal movement of bale loader 5 about chassis 3. As shown in FIGS. 3 and 6d, activation means 26 preferably comprises at least one activation lever 27 that contacts the chassis upon upward rotation or pivotal movement of bale loader 5. As bale loader 5 is rotated upwardly toward a vertical orientation, activation lever 27 will come into contact with roller 32 positioned on side 25 of receiving table 4. Further rotational movement of bale loader 5 then causes a rotation or pivoting of kicker rail 23 about inwardly disposed longitudinal arm 8 and results in the application of an additional laterally directed force being applied to bale 24 driving it inwardly toward the centre of bale receiving table 4. It will thus be appreciated that activation lever 27 and kicker rail 23 together assist in the expulsion of bale 24 from bale receiving opening 11 so that the bale is fully received upon the upper surface of table 4. Once bale loader 5 has been fully rotated through full extension of cylinder 20 and bale 24 deposited upon table 4, cylinder 20 is retracted to return bale loader 5 to its generally horizontal position, slightly above the ground level, so that next bale can be directed and received into bale receiving opening 11.

Figure 7:
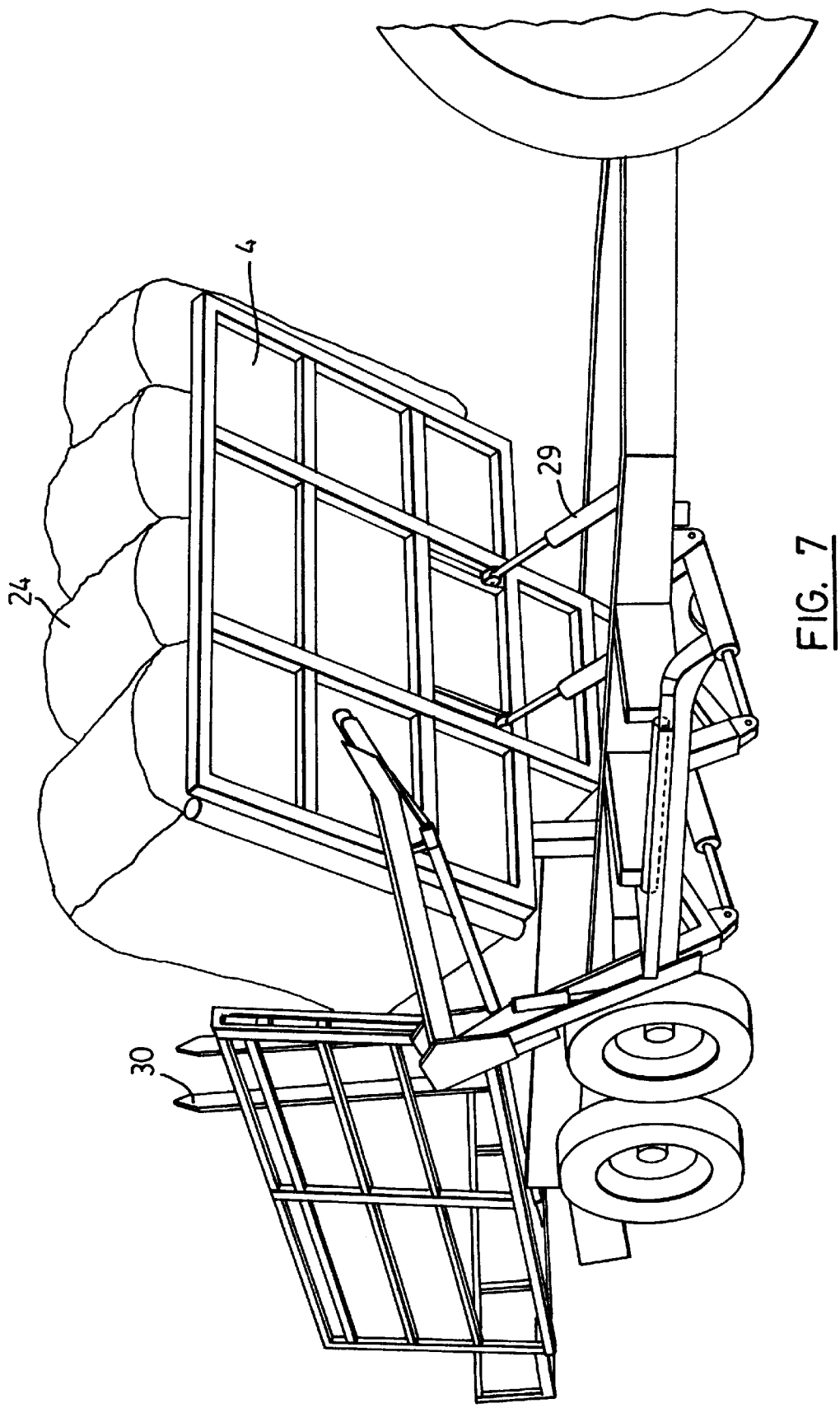
FIG. 7 is a front side perspective view of the bale loading apparatus where a plurality of bales that have been deposited upon a forward table are being lifted for storage on a rearward table; and, FIG. 8 is a front side perspective view of the bale loading apparatus wherein the rearward table has been rotated to an approximately vertical position so as to unload the bales of hay or straw retained thereon.

In one embodiment of apparatus 1, there is further included a rearward bale receiving table 28. Table 28 is positioned immediately behind bale receiving table 4 and also pivotally mounted upon chassis 3. When bale receiving table 4 has been loaded to its capacity, it is rotated upwardly, preferably through the use of pneumatic or hydraulic cylinders 29, in order to deposit the bales thereon onto rearward table 28. As shown in FIG. 7, when pivoted upwardly, bale receiving table 4 will deposit bales onto rearward table 28 such that they are oriented in an upward fashion and supported on their ends. Typically rearward table 28 would include a self-adjusting tailgate or fork 30 to support and maintain the bales in a vertical orientation. Rearward table 28 is also preferably inclined toward bale receiving table 4 such that bales that are loaded thereon have a tendency to lean backwardly and be supported by tailgate 30. After the contents of bale receiving table 4 have been deposited onto rearward table 28, bale receiving 4 may be returned to its generally horizontal position and once again loaded by bale loader 5. Subsequent rows of bales of hay or straw on table 4 may be similarly deposited onto rearward table 28. To accommodate subsequent rows of bales loaded onto table 28 from table 4, self-adjusting tailgate 30 may be manually or automatically adjusted toward the rear of table 28.

Upon fully loading rearward table 28, apparatus 1 may be towed or driven to a desired location for unloading. At that point, rearward table 28 is rotated upwardly by way of additional pneumatic or hydraulic cylinders 31. Rotation of table 28 to an approximately vertical position will cause bales loaded thereupon to be unloaded onto the ground and maintained in a generally rectangular, stacked configuration. Completing the unloading cycle then merely requires pulling apparatus 1 away from the stack of bales to remove self-adjusting tailgate 30 from beneath the lower bales. Thereafter, rearward table 28 is rotated back to its resting position on chassis 3 wherein it is slightly inclined toward bale receiving table 4.

In addition to the structure described above and as show in the attached drawings, bale loading device 1 will typically include a hydraulic or pneumatic control system to operate the various cylinders that result in movement of structures utilized for purposes of loading and unloading bales of hay or straw. It will be appreciated by those skilled in the art that a wide variety of different control systems could be utilized for such purposes. For example, in its simplest form the control system could compromise a series of lines or piping connected to manual control switches or levers. In a more complex form, the control system may include a series of sensors or limit switches that are connected to a microprocessor control that automatically activates the various cylinders at the appropriate time. The source of pressurized pneumatic or hydraulic fluid may be self contained within apparatus 1 or may be drawn from facilities available upon the tractor or other vehicle used to tow the bale loading apparatus. In addition, while in the preferred embodiment the means of activating the various components of bale loading apparatus 1 is through the use of pneumatic or hydraulic cylinders, it should be realized that mechanical gear and shaft drive systems, or electrical drive systems, including electric solenoids, may be used.

It is to be understood that what has been described are the preferred embodiments of the invention and that it may be possible to make variations to these embodiments while staying within the broad scope of the invention. Some of these variations have been discussed while others will be readily apparent to those skilled in the art.

I claim:

1. An apparatus for loading and transporting bales of hay or straw, the apparatus comprising:

(i) a chassis having mounted thereon a plurality of wheels to permit said chassis to be moved along the surface of the ground;

(ii) at least one bale receiving table mounted on said chassis to receive one or more bales of hay or straw loaded thereon;

(iii) a bale loader pivotally mounted on said chassis, said bale loader including an inwardly disposed longitudinal arm and an outwardly disposed longitudinal arm, said inwardly and outwardly disposed longitudinal arms laterally spaced apart by a cross member, said inwardly and outwardly disposed longitudinal arms and said cross member being generally coplaner planar with at least one of said arms pivotally connected to said cross member;

(iv) means to pivot at least one of said inwardly or outwardly disposed longitudinal arms about said cross member to increase or decrease the distance between said arms so as to grasp or release a bale of hay or straw therebetween; and, (v) means to pivot said bale loader about said chassis to enable the lifting of a bale of hay or straw onto said bale receiving table, wherein said outwardly disposed longitudinal arm includes a longitudinal roller, said roller at an inclined position relative to, and positioned along, the surface of said outwardly disposed longitudinal arm facing said inwardly disposed longitudinal arm such that pivotal movement of at least one of said inwardly or outwardly disposed arms, to decrease the distance between said arms when a bale is positioned therebetween, causes said roller to lift the bale from the ground and be partially supported by said outwardly disposed longitudinal arm.

2. The device as claimed in claim 1 wherein said inwardly disposed longitudinal arm is fixed to said cross member and said outwardly disposed longitudinal arm is pivotally connected to said cross member, said means to pivot said outwardly disposed longitudinal arm causing said arm to move towards or away from said inwardly disposed longitudinal arm and thereby permitting the grasping or releasing of a bale of hay or straw received between said arms.

3. The device as claimed in claim 2 wherein said inwardly disposed longitudinal arm has an outer edge generally facing said outwardly disposed longitudinal arm and includes a kicker rail pivotally mounted along said outer edge, said kicker rail received beneath and partially supporting a bale when a bale is received between said outwardly and said inwardly disposed longitudinal arms and said outwardly disposed longitudinal arm is pivoted towards said inwardly disposed longitudinal arm to grasp the bale.

4. The device as claimed in claim 3 wherein said kicker rail includes activation means to cause said kicker rail to rotate relative to said inwardly disposed longitudinal arm upon the upward pivotal movement of said bale loader about said chassis, said rotation of said kicker rail assisting in movement of a bale onto said bale receiving table.

5. The device as claimed in claim 4 wherein said activation means comprises at least one activation lever, upon upward pivotal movement of said bale loader said activation lever contacting said chassis such that further upward pivotal movement of said bale loader causes rotation of said kicker rail about said inwardly disposed longitudinal arm.

6. The device as claimed in claim 5 including one or more rollers mounted along the edge of said bale receiving table adjacent to said bale loader, said one or more rollers facilitating in the deposition of a bale of hay or straw onto said bale receiving table.

7. The device as claimed in claim 6 wherein said means to pivot said outwardly disposed longitudinal arm is a hydraulic or pneumatic cylinder.

8. The device as claimed in claim 7 wherein said means to pivot said bale loader about said chassis is a hydraulic or pneumatic cylinder.

9. A bale loading device for loading bales of hay or straw onto a wagon or platform, the device comprising:

(i) an inwardly disposed longitudinal arm and an outwardly disposed longitudinal arm connected to and laterally spanned by a cross member, said inwardly and outwardly disposed longitudinal arms and said cross member defining a bale receiving opening therebetween for receiving a bale of hay or straw;

(ii) pivot means to pivot said inwardly and outwardly disposed longitudinal arms and said cross member upwardly so as to deposit a bale of hay or straw onto the wagon or platform when the bale is received within said bale receiving opening;

(iii) at least one kicker arm pivotally connected to said inwardly disposed longitudinal arm, said kicker arm assisting in the expulsion of a bale of hay or straw from said bale receiving opening onto the wagon or platform through the application of force to the bale; and, (iv) activation means to cause said kicker arm to rotate relative to said inwardly disposed longitudinal arm upon said pivot means upwardly pivoting said inwardly and outwardly disposed longitudinal arms and said cross member, wherein said activation means comprises at least one activation lever, upon upward pivotal movement of said inwardly and outwardly disposed longitudinal arms and said cross member said activation lever contacting a portion of the wagon or platform such that further upward pivotal movement of said inwardly and outwardly disposed longitudinal arms and said cross member causes rotation of said kicker arm about said inwardly disposed longitudinal arm and a resulting application of force to the bale to assist in its expulsion from said bale receiving opening.

10. The device as claimed in claim 9 including a plurality of kicker arms connected to a kicker rail, said kicker rail oriented generally parallel to said inwardly disposed longitudinal arm.

11. The device as claimed in claim 10 wherein said outwardly disposed longitudinal arm is pivotally connected to said cross member thereby permitting said outwardly disposed longitudinal arm to be rotated relative to said cross member and said inwardly disposed longitudinal arm to vary the dimensions of said bale receiving opening.

12. The device as claimed in claim 11 including one or more rollers positioned along the edge of the wagon or platform to facilitate in the deposition of a bale of hay or straw onto the wagon or platform.

13. The device as claimed in claim 12 wherein said pivot means includes a hydraulic or pneumatic cylinder.

* * * * *